US011220800B2

(12) United States Patent
Lebon et al.

(10) Patent No.: US 11,220,800 B2
(45) Date of Patent: Jan. 11, 2022

(54) SYSTEM FOR ANCHORING A PILE OR JACKET AND CORRESPONDING METHOD

(71) Applicant: SOLETANCHE FREYSSINET, Rueil-Mal-Maison (FR)

(72) Inventors: Jean-Daniel Lebon, Saint-Germain-en-Laye (FR); Antoine Carry, Versailles (FR)

(73) Assignee: SOLETANCHE FREYSSINET, Rueil-Mal-Maison (FR)

( * ) Notice: Subject to any disclaimer, the term of this patent is extended or adjusted under 35 U.S.C. 154(b) by 0 days.

(21) Appl. No.: 16/757,209

(22) PCT Filed: Oct. 16, 2018

(86) PCT No.: PCT/EP2018/078190
§ 371 (c)(1),
(2) Date: Apr. 17, 2020

(87) PCT Pub. No.: WO2019/076865
PCT Pub. Date: Apr. 25, 2019

(65) Prior Publication Data
US 2021/0123202 A1 Apr. 29, 2021

(30) Foreign Application Priority Data
Oct. 19, 2017 (EP) .................................. 17306426

(51) Int. Cl.
*E02D 13/00* (2006.01)
*E02D 7/28* (2006.01)
*F03D 13/25* (2016.01)
(Continued)

(52) U.S. Cl.
CPC ............... *E02D 13/00* (2013.01); *E02D 7/28* (2013.01); *E02D 5/285* (2013.01); *E02D 27/425* (2013.01);
(Continued)

(58) Field of Classification Search
CPC ........... E02D 13/00; E02D 7/28; E02D 13/04; E02D 5/28; E02D 5/285; E02D 5/34
(Continued)

(56) References Cited

U.S. PATENT DOCUMENTS 4,077,224 A * 3/1978 Coone ................ E02B 17/0008
405/225
2015/0368871 A1 12/2015 Seidel et al.

FOREIGN PATENT DOCUMENTS

| DE | 1212005 B | 3/1966 |
| DE | 12 12 005 B | 3/1996 |
| DE | 102012024412 A1 | 6/2014 |
| EP | 874088 | * 10/1998 |

(Continued)

OTHER PUBLICATIONS

International Search Report received from the European Patent Office in Application No. PCT/EP2018/078190 dated Apr. 12, 2018.
Written Opinion of the International Searching Authority received from the European Patent Office in Application No. PCT/EP2018/078190 dated Apr. 25, 2019.
(Continued)

*Primary Examiner* — Sean D Andrish
(74) *Attorney, Agent, or Firm* — The Marbury Law Group, PLLC

(57) ABSTRACT

A system for holding a tubular sleeve (2) in a receiving structure during setting of a cement or other binder introduced in a fluid state between the sleeve (2) and the receiving structure, comprising:—at least one expandable structure (4) mounted on the sleeve (2), deformable from an inactive configuration allowing insertion of the sleeve (2) in the receiving structure to an active configuration immobilizing the sleeve (2) in the receiving structure,—at least one corresponding tool to be inserted in the sleeve (2), configured for acting on the expandable structure (4) to cause it to pass from the inactive configuration to the active configuration.

26 Claims, 12 Drawing Sheets

(51) Int. Cl.
(2006.01) *E02D 5/28*
(2006.01) *E02D 27/42*
(2006.01) *E02D 27/52*

(52) U.S. Cl.
CPC .... *E02D 27/525* (2013.01); *E02D 2200/1685* (2013.01); *E02D 2250/0023* (2013.01); *E02D 2300/002* (2013.01); *E02D 2300/0029* (2013.01); *E02D 2450/00* (2013.01); *F03D 13/25* (2016.05)

(58) Field of Classification Search
USPC ........................................................ 405/232
See application file for complete search history.

(56) References Cited

FOREIGN PATENT DOCUMENTS

| | | |
|---|---|---|
| EP | 2 703 564 A1 | 3/2014 |
| GB | 2 459 874 A | 11/2009 |
| JP | 52-022610 U | 2/1977 |
| JP | 55-9953 A | 1/1980 |
| JP | 06-108462 A | 4/1994 |
| WO | 2015003257 A1 | 1/2015 |

OTHER PUBLICATIONS

Notice of Reasons for Refusal received in related Japanese Patent Application No. 2020-521886 dated Jun. 29, 2021.
European Proceedings received in related European Patent Application No. 18 786 340.2-1002 dated Mar. 16, 2021.

\* cited by examiner

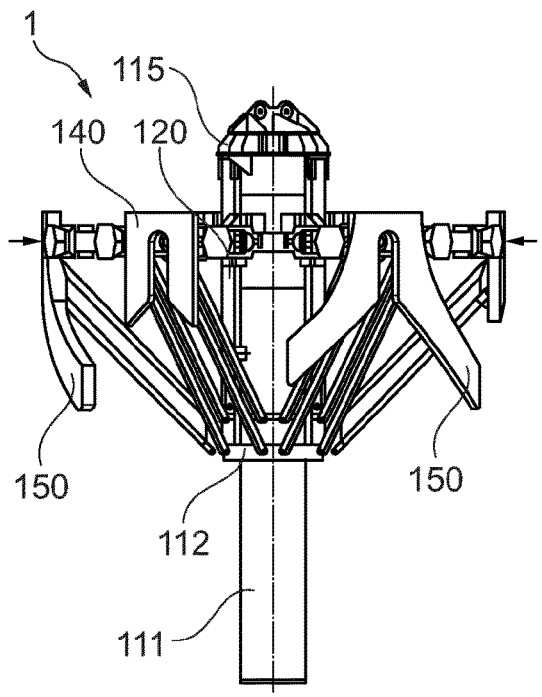
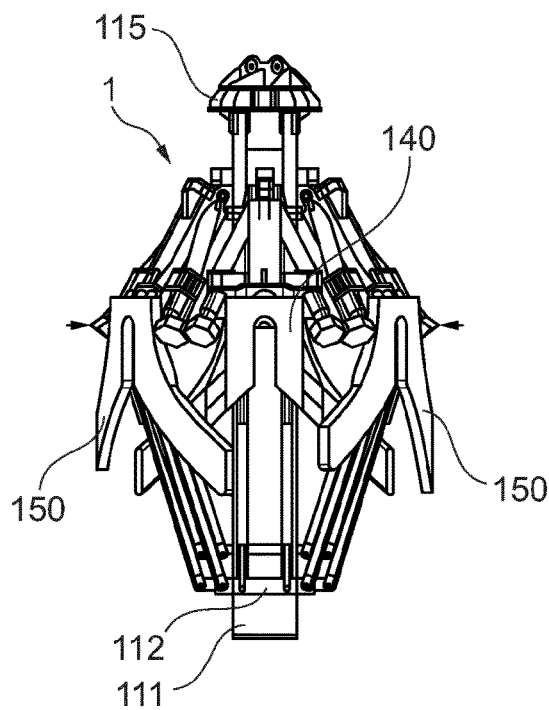
Fig. 8B  Fig. 8A
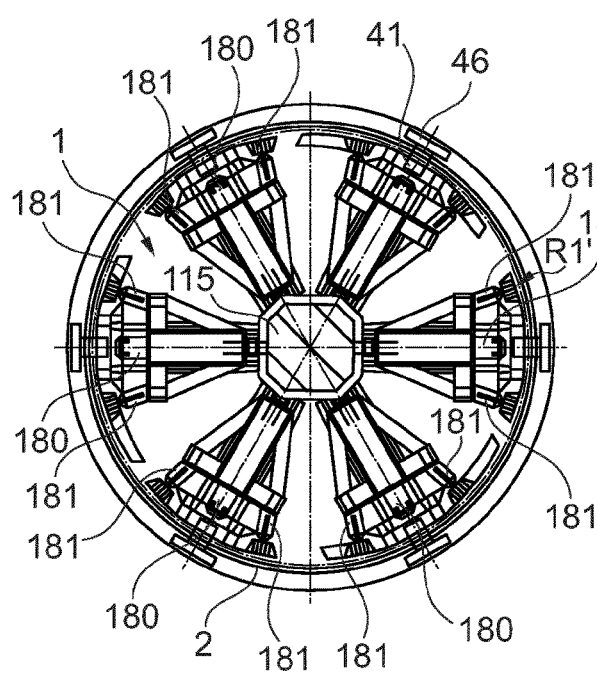
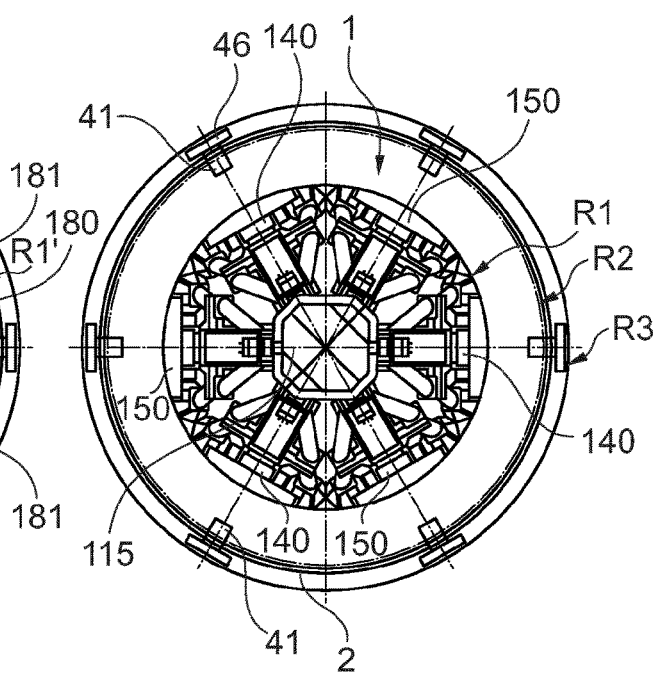
Fig. 9B  Fig. 9A

SYSTEM FOR ANCHORING A PILE OR JACKET AND CORRESPONDING METHOD

CROSS REFERENCE TO RELATED APPLICATIONS

This is a national stage application of PCT/EP2018/078190, filed internationally on Oct. 16, 2018, which claims priority to European Application No. 17306426.2, filed on Oct. 19, 2017, both of which are incorporated by reference herein in their entireties.

The present invention relates to anchor piles or jackets that are used for subsea installations and to methods for anchoring piles or jackets.

BACKGROUND OF THE INVENTION

Some offshore windfarms use wind turbines comprising a nacelle and a rotor mounted thereto, on top of large diameter towers supported by foundation piles or jackets anchored in the seabed.

Jackets are towers in lattice structures that have usually three or four legs anchored in the seabed, for example using anchor piles such as driven piles.

Various techniques have been developed for achieving the anchorage of a pile, depending on the geological nature of the soil.

When the soil permits, the anchor pile is vibrated or impact driven into its final position deep in the seabed.

However, in the presence of very hard materials such as rocks, these conventional techniques are not suited and it becomes necessary to drill a foundation hole in the seabed using appropriate offshore drilling equipment, then insert the pile and immobilize it in the foundation hole with cement or other binder.

Use of this technique requires that the pile be immobilized during setting of the cement or other binder. This immobilization is carried out in the prior art with a stabilization structure that is laid on the sea bed the time needed for the concrete or other binder to set. Such stabilization structures are difficult and costly to install when the sea bed is irregular and in deep waters.

Furthermore, in cases the pile has a tubular sleeve of a large diameter, e.g. at least 1 or 2 m or more (for example 4 or 8 m for some offshore wind generators), conventional techniques such as vibration or hammering are not appropriate for anchoring the pile.

BRIEF SUMMARY OF THE INVENTION

The present invention aims to avoid the use of the stabilization structures of the prior art and to propose an improved solution to the anchorage of piles or jackets in immerged soils, especially large diameter piles.

The invention achieves this goal thanks to a system for holding a tubular sleeve, in particular a sleeve of an anchor pile or of a jacket leg, in a receiving structure such as a foundation hole or an anchor pile, during setting of a cement or other binder introduced in a fluid state between the sleeve and the receiving structure, that comprises at least one expandable structure mounted on the sleeve, deformable from an inactive configuration allowing insertion of the sleeve in the receiving structure to an active configuration immobilizing the sleeve in the receiving structure, and at least one corresponding tool to be inserted in the sleeve, configured for acting on the expandable structure to cause it to pass from the inactive configuration to the active configuration.

The invention offers multiple advantages.

The expandable structure prevents in an efficient manner any movement of the pile or jacket leg during setting of the concrete or other binder, despite the environmental loads exerted on the pile by water currents or by any structure connected to the pile.

Furthermore, the immobilization is easy to achieve even when the soil around the foundation hole or other receiving structure is irregular because there is no need to install an external stabilization structure.

The tool is easy to insert into the pile or jacket leg and can be extracted after the cement or other binder has set, so it can be re-used quickly for anchoring another pile or jacket leg.

The vessel handling the anchoring of the piles or jacket legs can stay less time on the site, thus reducing significantly the overall cost of the installation of the windfarm. Furthermore, the tool may be removed easily, and does not require heavy load equipment.

After withdrawal of the tool, the expandable structure is left in place but does not constitute hard spots that could induce detrimental concentrated loads and damage the structure in the long run.

The tool may be configured to adjust to various inner diameters of piles or jacket legs, which facilitates further its re-use.

In exemplary embodiments of the invention, the expandable structure comprises a plurality of movable elements mounted on the sleeve. Preferably, these elements are to stay in place on the tubular sleeve after the tool is removed and are lost. However, their cost is relatively low, as their structure may remain quite simple. There are at least two movable elements, more preferably at least three, better at least four, even better six of them. Use of at least three movable elements may help center the pile in the foundation hole or other receiving structure.

Preferably, these elements are mounted so as to slide with respect to the tubular sleeve. The elements may be each immobilized initially by a fusible connection (for example a small pin), configured to free the element when a predefined force is exerted on it by the tool.

Preferably, the at least one expandable structure comprises radially oriented guide members mounted on an internal surface of the sleeve and the elements comprise fingers (also called rods) engaged in respective guiding members so as to slide therein. The fingers may comprise at their end intended to contact the soil or the inner surface of said other receiving structure a corresponding pad. The tubular sleeve may be reinforced around the guiding members.

The expandable structure is preferably positioned on the sleeve so that when the sleeve is in place in the foundation hole or other receiving structure the expandable structure is closer to the opening of the receiving structure than to the bottom thereof. The expandable structure may be located at a small distance from the soil surface or from the top end of said other receiving structure, for example less than 2 meters, even better less than 1 meter.

In a usual configuration, there is no need for an expandable structure at sleeve bottom since it is expected to rest firmly onto foundation hole's bottom or other receiving structure's bottom or to be driven in soil.

However, in case the bearing of pile sleeve is too loose at foundation hole's bottom or other receiving structure's bottom with a risk of movement, it is possible to add a similar expandable structure located in the lower part of the sleeve. Both expandable structures may be installed on the sleeve with a similar process, and actuated with similar tools. The tool intended to actuate the expandable structure located near the bottom end of the sleeve would be first introduced. The range of retraction of the tool intended for actuation of the lower expandable structure may in such a situation be large enough for the tool to pass the top expandable structure during its descent.

Accordingly, the system may comprise an additional expandable structure being positioned at a lower position below sleeve mid height, to hold the bottom section of the pile or jacket leg in the foundation hole or other receiving structure.

The tool preferably comprises first reliefs and the expandable structure comprises corresponding second reliefs configured to interfere with the first reliefs during introduction of the tool in the sleeve so that the tool takes a predefined angular (azimuthal) position with respect to the expandable structure.

The first reliefs preferably comprise crown elements each with an opening having edges converging towards a notch for engaging a respective guide member of the expandable structure. The converging edges come into abutment with the guiding members during insertion of the tool in the tubular sleeve and guide the notches onto the guiding members. Thus the tool is positioned in azimuth at the end of its descent into the tubular sleeve of the pile or jacket leg.

Each crown element preferably has an arcuate shape around a longitudinal axis of the tool.

The tool preferably comprises a clamping mechanism for clamping the tool inside the tubular sleeve when actuated. It is advantageous to clamp the tool inside the sleeve so that it can act on the fingers with different pushing forces, so as to center the sleeve in the foundation hole and keep the sleeve vertical during the setting of the cement or other binder.

This clamping mechanism may comprise a deformable articulated structure for transforming a contraction force along a longitudinal axis of the articulated structure into a radially outward expansion thereof.

In an exemplary embodiment, the clamping mechanism comprises a top platform and a bottom platform movable relative to the top platform, at least one cylinder to exert said contraction force causing the platforms to move closer one relative to the other, and pairs of bi-articulated arms each connected at one end on a respective one of the platforms and connected together at the other end to a junction, so that the junction moves outwardly when the platforms are caused to get closer to each other by the actuation of the cylinder. This at least one cylinder is preferably in the axial direction of the tubular sleeve.

The crown elements are carried by the junctions. Each junction may carry a pressure pad for transmitting a clamping force to an inner surface of the tubular sleeve when the clamping mechanism is actuated. The pressure pad may define a corresponding one of the bottom notches.

The tool may comprise columns on which the platforms slide, for example three such columns.

The tool may comprise a core member carrying cylinders for acting on the expandable structure. These cylinders preferably are radial and horizontal. The core member may support the columns.

The tool may comprise the same number of cylinders than of above cited fingers, preferably at least three cylinders, better six cylinders.

In a variant, the crown elements comprise guiding crown element alternating with intermediate crown element of reduced angular extension, the guiding crown elements comprising rails diverging one from the other in the downward direction, the angular extension of rails being less than the angular pitch between the movable elements so that only one rail contacts the expandable structure when the tool is inserted into the sleeve, one of the rails having a larger angular extension than the other rail.

In an exemplary embodiment, the tool comprises a column on which arms are articulated, the arms each bearing a central cylinder for acting on the expandable structure and at least one other cylinder for clamping the tool inside the sleeve. Each arm may carry two side cylinders on either side of the central cylinder. These side cylinder may be oriented relative to the longitudinal axis of the arm so that they are oriented substantially perpendicularly to the sleeve when the tool is clamped inside the sleeve.

Each crown element may be articulated at one end of a respective arm.

The tool may comprise:
a sliding ring,
at least one cylinder for moving the ring along the column,
parallel bars connecting each crown element to the sliding ring so that the displacement of the sliding ring along the column causes the arms to pivot with the crown elements keeping an orientation substantially parallel to a longitudinal axis of the tool.

As mentioned above, the sleeve may be the sleeve of an anchor pile, in particular a monopile anchor pile or an anchor pile belonging to a multi-pile anchor structure. In a variant, the sleeve may be a sleeve of a jacket leg.

Especially when the sleeve is a sleeve of a jacket leg, the system may comprise an upper and a lower seal interposed between the sleeve and the receiving structure and delimiting a space for accommodating said cement or other binder. These seals are preferably inflatable seals, which can be inflated once the sleeve has been introduced into the anchor pile.

A further object of the invention is a tool as defined above, for acting on an expandable structure mounted on a sleeve in which the tool is inserted.

Such a tool may comprise all or part of the features defined above for the tool of the system in accordance with the invention.

A further object of the invention relates to a method for anchoring a tubular sleeve, in particular a sleeve of a pile or of a jacket leg in a foundation hole or other receiving structure, in particular a foundation hole drilled in subsea soil or an anchor pile such as a driven pile, with a system as defined above, comprising:

a) introducing the tubular sleeve in the receiving structure, with the expandable structure mounted on the sleeve in an inactive configuration, b) expanding with the tool the expandable structure to immobilize the sleeve in the foundation hole or other receiving structure, c) leaving a cement or other binder introduced in the foundation hole or other receiving structure to set, d) removing the tool after setting of the cement or other binder.

Preferably, the tool is introduced in the tubular sleeve in a retracted state, the method comprising between a) and b) an expansion of the tool to clamp the latter in the tubular sleeve.

The clamping may result from an expansion of the tool inside the tubular sleeve.

As a result of operation of the tool, the expandable structure contacts in the expanded state the inner surface of the foundation hole or other receiving structure.

For example, the expandable structure is first expanded so as to contact the soil around the pile and center the pile in the foundation hole and keep it into a target position, for example vertical. The contact pressure may then be raised while keeping the pile into position. Then the concrete or other binder is introduced between the outside of the tubular sleeve and the inner surface of the foundation hole.

In a variant, the expandable structure contacts in the expanded state a tubular casing extending in the foundation hole between the tubular sleeve and the inner surface of the foundation hole, concrete or other binder being introduced between the tubular sleeve and the casing and between the casing and the inner surface of the foundation hole.

The invention may also be used to immobilize such a casing in a first step in the foundation hole; in such case, the casing may be provided with at least one expandable structure identical to the one of the pile. Then, after setting of the cement or other binder used to fix the casing in the foundation hole, the tool is removed, the pile is inserted into the casing and the tool is brought back into the pile.

Especially when the receiving structure is an anchor pile and the sleeve is a sleeve of a jacket leg, the method may comprise inflating, between the sleeve and the anchor pile, inflatable seals to delimit axially a space for accommodating the cement or other binder.

Especially when the sleeve is a sleeve of an anchor pile, but not only, the tool may be introduced through a neck portion of reduced diameter of the sleeve.

BRIEF DESCRIPTION OF THE DRAWINGS

FIGS. 5A to 5G is a schematic sequence of operation of the tool, FIGS. 8A and 8B show the tool of FIGS. 6 and 7 in retracted and expanded configurations respectively, FIGS. 9A and 9B illustrate the cooperation of the tool of FIGS. 6 and 7 with the expandable structure when the tool is in place in the tubular sleeve.

DETAILED DESCRIPTION OF EMBODIMENTS OF THE INVENTION

Figure 1:
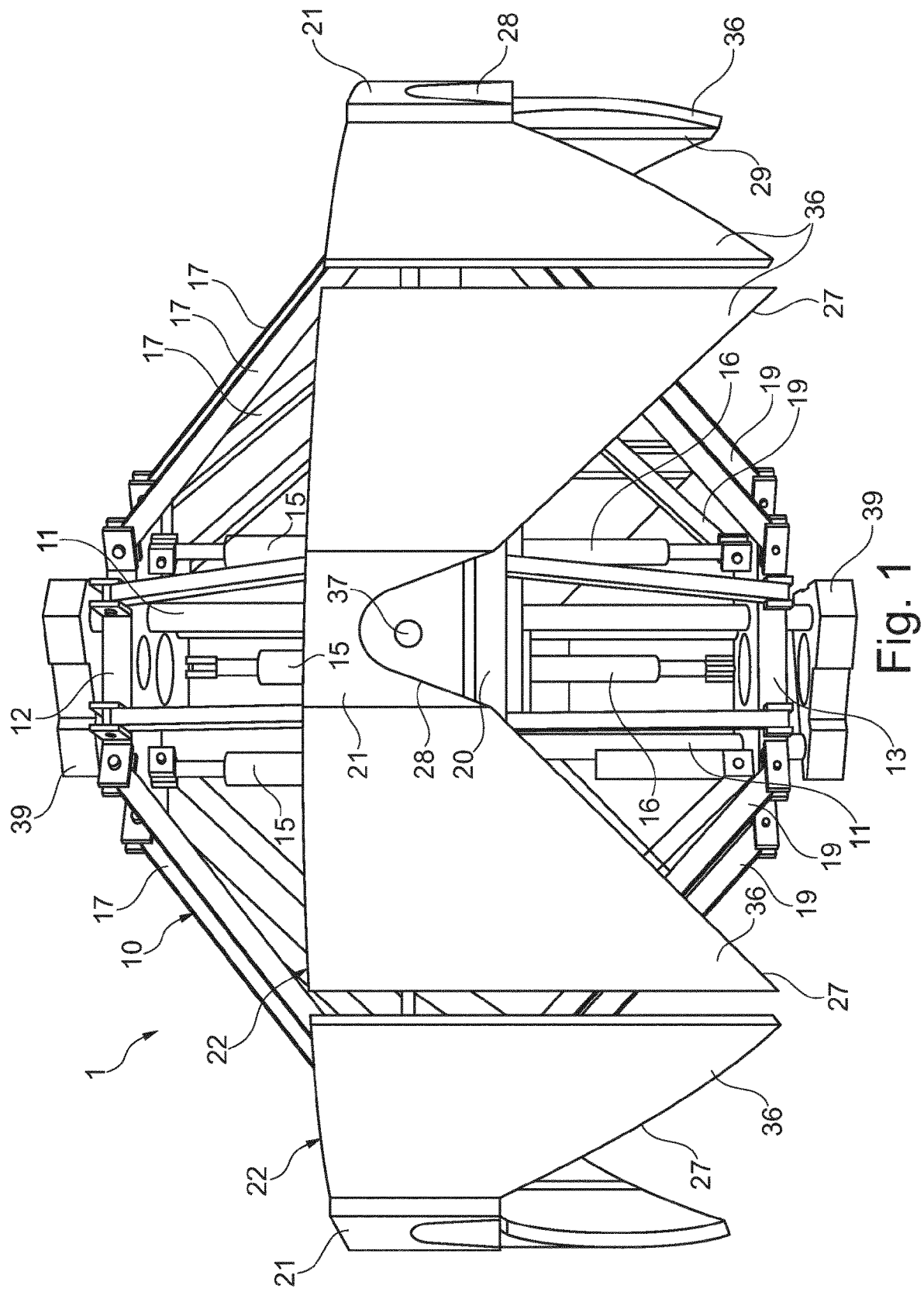
FIG. 1 is perspective side view of a first embodiment of a tool in accordance with the present invention.
Figure 2:
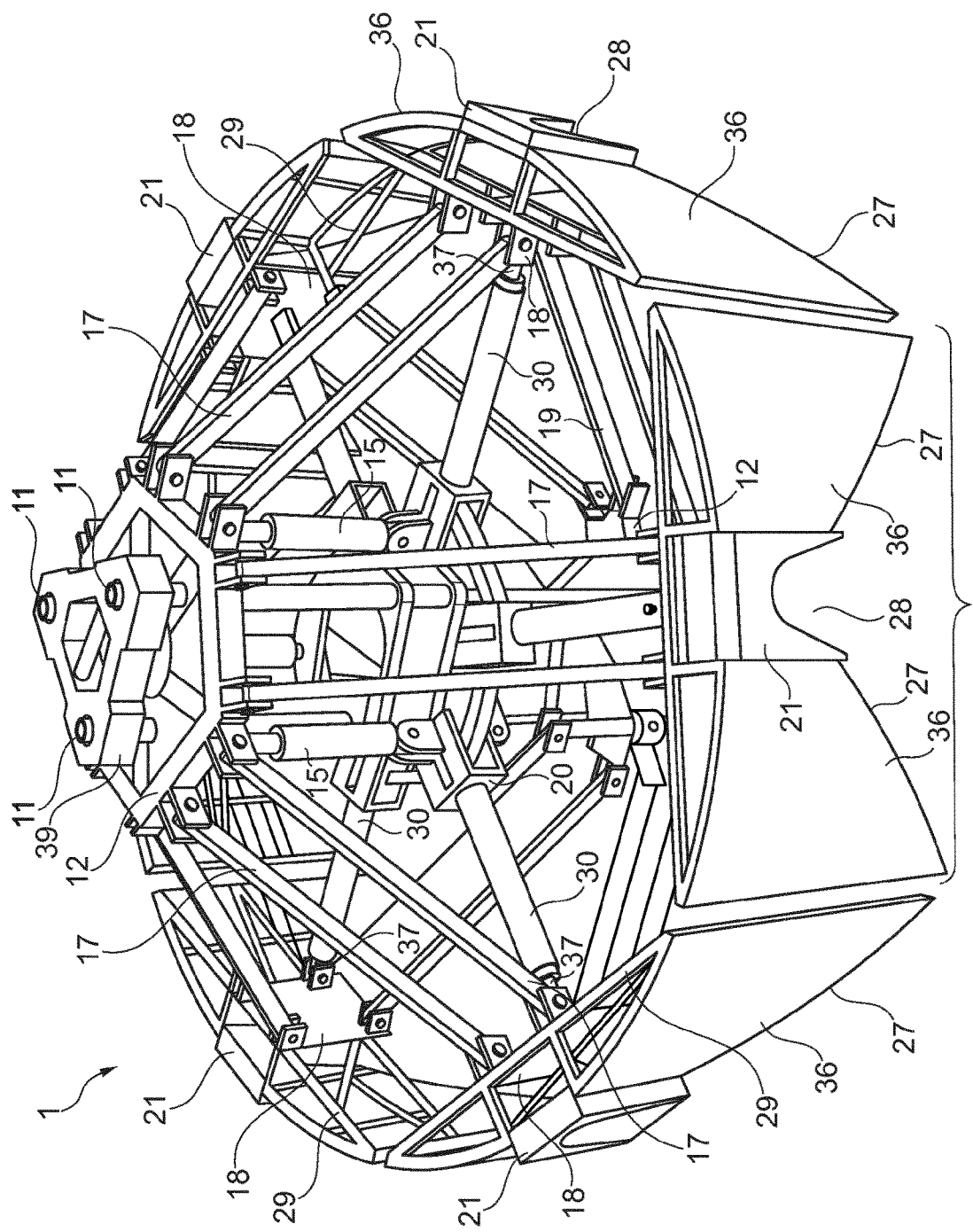
FIG. 2 is a perspective top view of the tool of FIG. 1.

FIGS. 1 and 2 show an example of a tool 1 in accordance with the present invention, before insertion in a tubular sleeve of a pile, for example a monopile or a pile of a multi-pile structure.

The tool 1 comprises a clamping mechanism 10 configured for clamping the tool 1 inside the tubular sleeve. This mechanism 10 allows a radial expansion of the tool so that it can be inserted in the tubular sleeve in a retracted state and expand when in place so as to firmly engage the tubular sleeve and become immobilized within the tubular sleeve.

Figure 4:
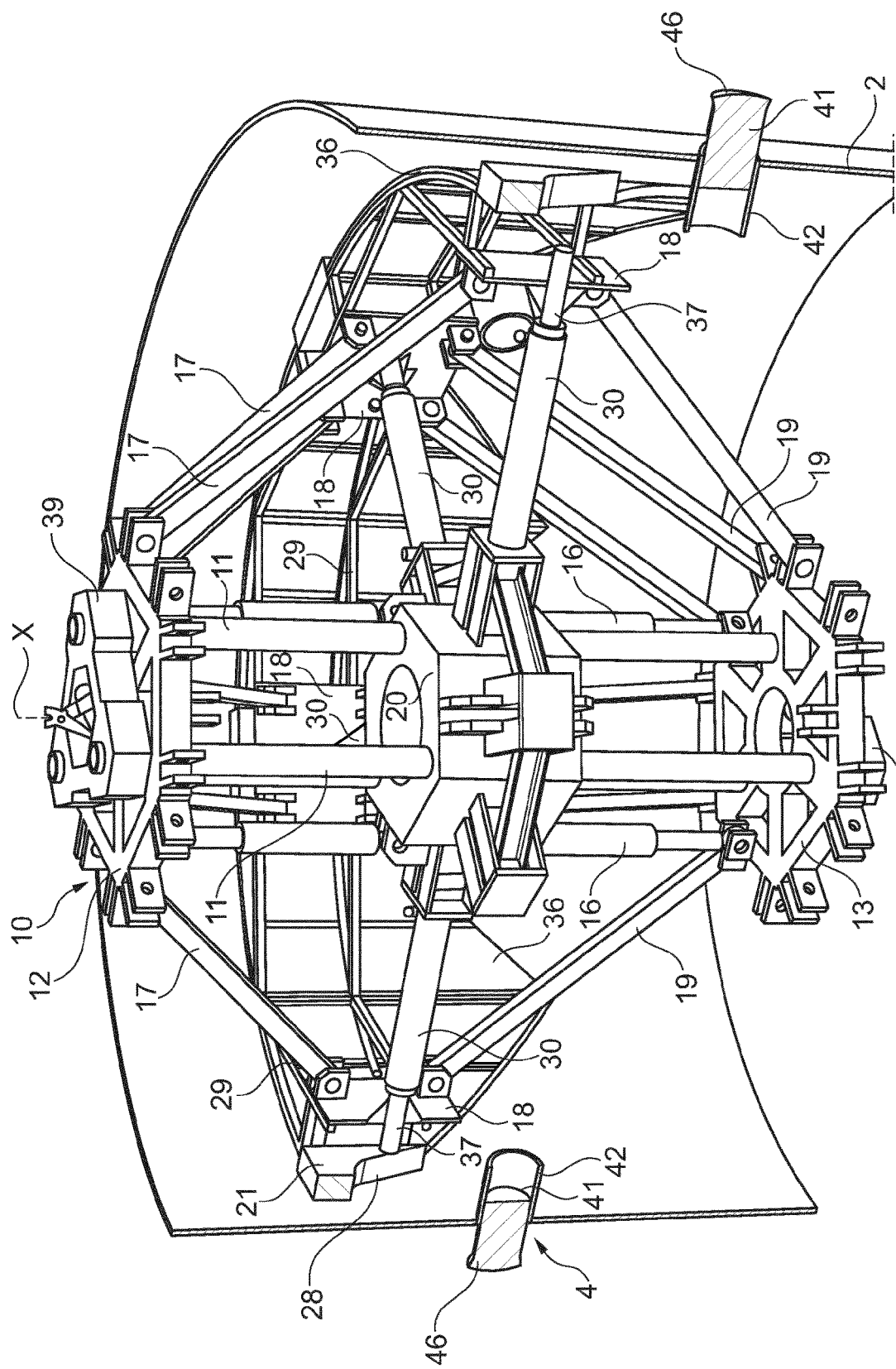
FIG. 4 illustrates cooperation of the tool with the expandable structure when the tool is in place in the tubular sleeve.

As can best be seen in FIG. 4, the clamping mechanism comprises a plurality of columns 11, for example three columns, extending parallel to a longitudinal axis X of the tool 1, and top 12 and bottom 13 platforms that can slide along the columns 11.

The tool 1 comprises a core member 20 situated half the way between the top and bottom platforms and through which the columns 11 extend. The columns 11 are fixed at their ends to top and bottom end members 39 that hold them parallel.

The top platform 12 is connected to the core member 20 via vertical cylinders 15 and the bottom platform 13 is connected to the core member 20 via vertical cylinders 16. Cylinders 15 and 16 may be any kind of cylinders capable of generating the desired force. Hydraulic cylinders are preferred. There may be two, preferably three, cylinders 15 and two, preferably three, cylinders 16.

Arms 17 are articulated at one end to the top platform 12 and at the opposite end to junction members 18. Arms 19 are articulated at one end to the bottom platform 13 and at their opposite end to the junction members 18.

The tool 1 may comprise six junction members 18, as shown, each junction member 18 being connected to a pair of parallel bottom arms 19 and to a pair of parallel top arms 17.

The arms 17 and 19 form together with the junction members 18 and the platforms 12 and 13 guided by the columns 11 an articulated structure capable of expanding radially outwards when a contracting force is exerted by the cylinders 15 and 16 to reduce the distance between the platforms 12 and 13.

Pressure pads 21 are carried by the junction members 18 for contacting the tubular sleeve 2 during expansion of the tool and clamping the latter therein.

The junction members 18 also carry crown elements 22 that extend on both sides of a pressure pad 21.

Each crown element 22 is formed as can be seen in FIG. 1 by a pair of arcuate plates 36 of a curvature slightly more than that of the internal surface of the tubular sleeve 2. Each plate 36 is held by a set of armature bars 29 visible in FIG. 4, supported by the corresponding adjacent junction member 18. The armature bars 29 also hold the pressure pads 21. The latter comprise a notch 28 opened towards the bottom of the tool 1.

Each crown element 22 has inclined edges 27 converging towards the notch 28.

The core member 20 holds horizontal cylinders 30 that each extend radially perpendicularly to the axis X, as shown in FIG. 4. The cylinders 30 are preferably hydraulic cylinders. There are preferably six cylinders 30, angularly spaced at 60° from each other.

The cylinders 30 have rods 37 whose longitudinal axis extends at a predefined distance below the bottom of a corresponding notch 28.

FIG. 4 shows the upper part of the tubular sleeve 2 of a pile in which the tool 1 is intended to be inserted. The tubular sleeve 2 supports in accordance with the invention an expandable structure 4 configured to cooperate with the tool 1.

Figure 3:
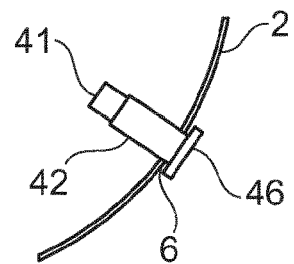
FIG. 3 is a partial view of a tubular sleeve of a pile with an example of expandable structure in accordance with the invention.

The expandable structure 4 comprises a set of radially oriented fingers 41 engaged in respective guiding members 42. Each guiding member 42 is constituted as best shown in FIG. 3 by a tube fixed to the wall of the tubular sleeve 2, in alignment with a corresponding perforation 6 made in the tubular sleeve 2. Each finger 41 can slide in the associated tube towards the outside, when pushed by the rods 37. The tubular sleeve 2 may be reinforced as appropriate to withstand the load during use of the tool 1. Each finger 41 is held into position in guiding member 42 so that a predefined moderate force is required to push it towards the outside. This can be a fusible temporary fastening element, such as a pin, that is broken under action of rods 37.

In the embodiment shown, the expandable structure 4 has six fingers 41 oriented at 60° from each other and the tool 1 has six crown elements 22 with six pressure pads 21.

The tubular sleeve 2 is typically made of a metal such as steel and the guiding members 42 are metallic and fixed to the tubular sleeve 2 by welding.

The fingers 41 may be provided at their distal end with an enlarged head 46 intended to contact the soil.

The notches 28 have a semi-circular bottom of a diameter that is substantially equal to the external diameter of the guiding members 42. Accordingly, the tool 1 may be oriented roughly before precise auto positioning in the tubular sleeve 2. At the end of the positioning, the horizontal cylinders 30 each face a corresponding finger 41.

The sequence of operations for anchoring the pile will now be described with reference to FIGS. 5A-5G.

First of all, a cylindrical foundation hole is drilled in the sea bed to receive the pile.

Then the tubular sleeve 2 is inserted in the foundation hole H and the tool 1 is introduced in a retracted state in the tubular sleeve 2, using a hoist present on a surface vessel, as illustrated in FIG. 5A.

During introduction of the tool 1, the notches 28 are guided by the edges 27 towards the guiding members 42, which orientates the tool 1 relative to the fingers 41. At the end of the introduction of the tool 1, the pressure pads 21 rest against the guiding member 42, while the fingers 41 are in a retracted state, as shown in FIG. 5B.

Then, the vertical cylinders 15 and 16 are operated to bring the platforms 12 and 13 closer to each other and cause the arms 17 and 19 to pivot towards the tubular sleeve 2.

The pressure pads 21 are brought in contact with the inner surface of the tubular sleeve by the expansion of the articulated structure, which clamps the tool 1 inside the tubular sleeve 2 ready for operation of the cylinders 30, as shown in FIG. 5C.

The clamping of the tool 1 in the tubular sleeve 2 causes the tool 1 to be centered in the pile.

Then, the cylinders 30 are activated to push the fingers 41 against the foundation hole inner surface S, as shown in FIG. 5D. The pressure exerted on the fingers 41 may first be moderate, until the fingers contact the soil. Then each cylinder 30 may be controlled independently so as to center the pile in the foundation hole and maintain its longitudinal axis vertical (or at any other desired position). The pressure exerted on the fingers by the cylinders is then controlled to immobilize the tubular sleeve 2 inside the foundation hole in the desired position. The fingers 41 are preferably relatively close to the opening of the foundation hole, so as to withstand more easily the lateral forces potentially exerted by the sea current on the pile.

Concrete C or any other binder is injected in the annular space around the tubular sleeve 2 inside the foundation hole H, as shown in FIG. 5E.

Thanks to the immobilization of the tubular sleeve 2 by the fingers 41, the setting of the concrete or other binder may take place in good conditions.

Figure 5G:
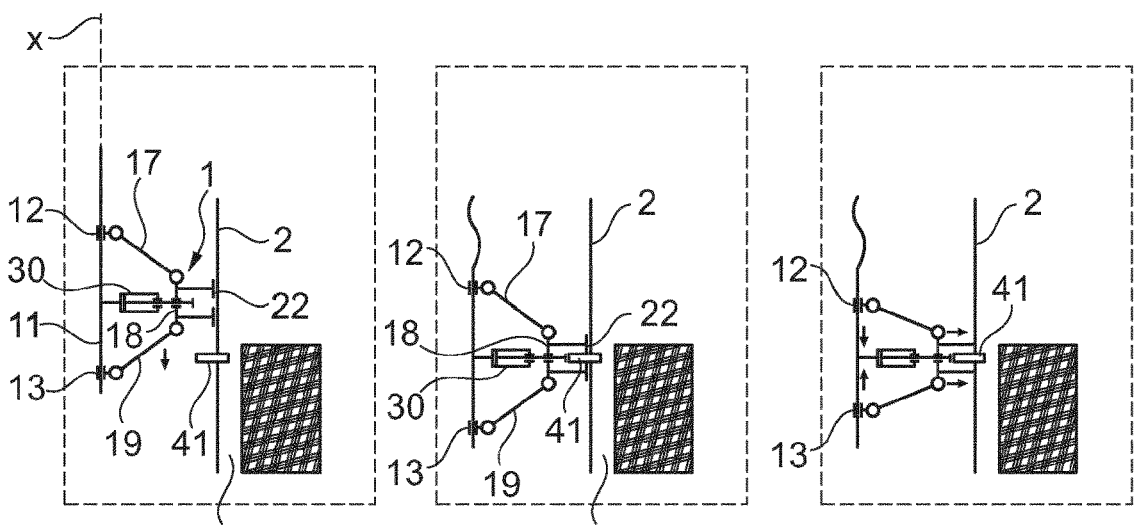
Figure 5G:
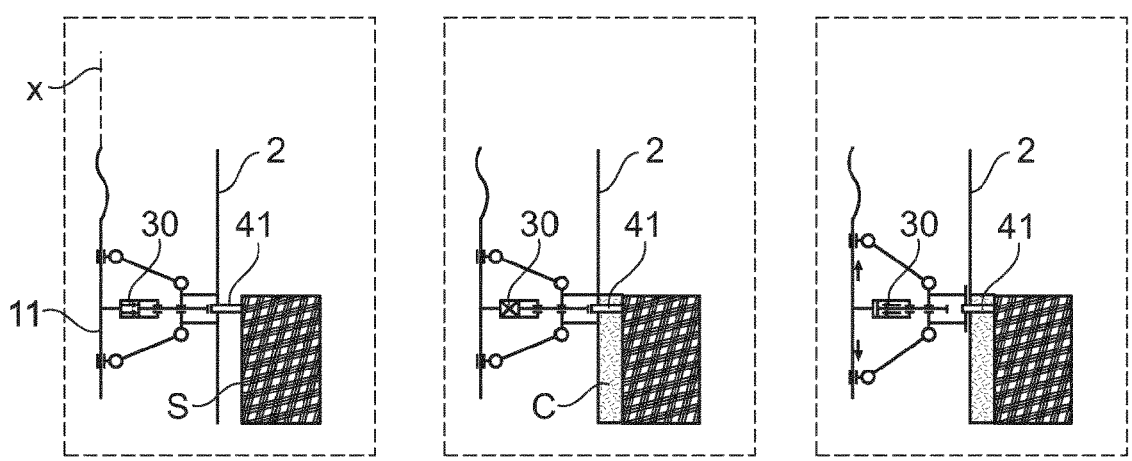
Figure 5G:
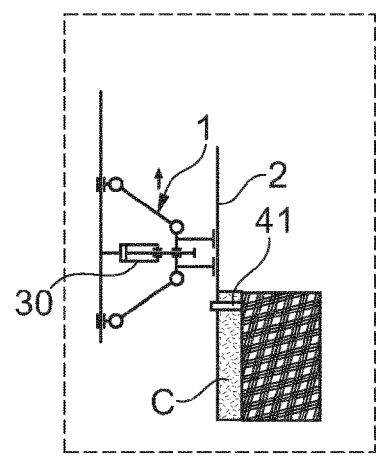

After setting, the cylinders 30 are retracted as shown in FIG. 5F, and the cylinders 15 and 16 are extended to retract the tool 1, as shown in FIGS. 5F and 5G.

The tool 1 may then be pulled away (as shown in FIG. 5G) from the tubular sleeve 2 and re-used with another pile.

In a variant not shown, the tool 1 is used twice, first to anchor a tubular casing equipped with an expandable structure similar to that disclosed above in relation to the tubular sleeve 2, and then for anchoring of the tubular sleeve 2 in the casing. During anchorage of the casing, a concrete or other binder is injected around the casing in the foundation hole.

In a variant not shown, another tool 1 and another expandable structure 4 are used to hold and anchor the tubular sleeve at a lower section closer to pile bottom.

The invention is not limited to the disclosed embodiment. For example, modifications may be brought to the expandable structure or tool.

The number of vertical cylinders or horizontal cylinders may be different.

The expandable structure may comprise different means for guiding the fingers; for example, bushings may be introduced in the tubes 42 for guiding the fingers.

The tool may be operated at various depths and with piles of various diameters. The piles may support any structure, and the invention is not restricted to piles supporting wind generators. For example, the piles may support hydroelectric generators.

A variant embodiment of a tool 1 made in accordance with the present invention will now be described in reference to FIGS. 6 to 23.

This tool 1 differs from the one previously described by the clamping mechanism 10 inter alia.

The tool 1 comprises a central column 111 that has preferably a cylindrical body 113 of circular cross section, as shown, on which a lower ring 112 (shown in isolation in FIGS. 15 and 16) is slidably mounted.

The sliding ring 112 preferably comprises a solid core 112C provided at its outer periphery with vertical and horizontal ribs, which serve to support couplings for other components of the tool 1, as will be detailed below. The fact that the core 112C is solid provides better resistance to compression load and helps to limit the deformations.

The column 111 is equipped at its upper end with an upper platform 115 provided with hoisting holes 116.

Vertical cylinders 120 are provided along the column 111 for acting on the sliding ring 112 so as to move the latter between a lower position shown in FIG. 8A and an upper position shown in FIG. 8B.

The cylinders 120 are preferably hydraulic cylinders. They are connected at their lower end to the sliding ring 112 and at their upper end to the upper platform 115. The stroke of the cylinders 120 may range from 2000 to 3000 mm, for example is about 2850 mm. Their force may be about 20 tons each.

Figure 14:
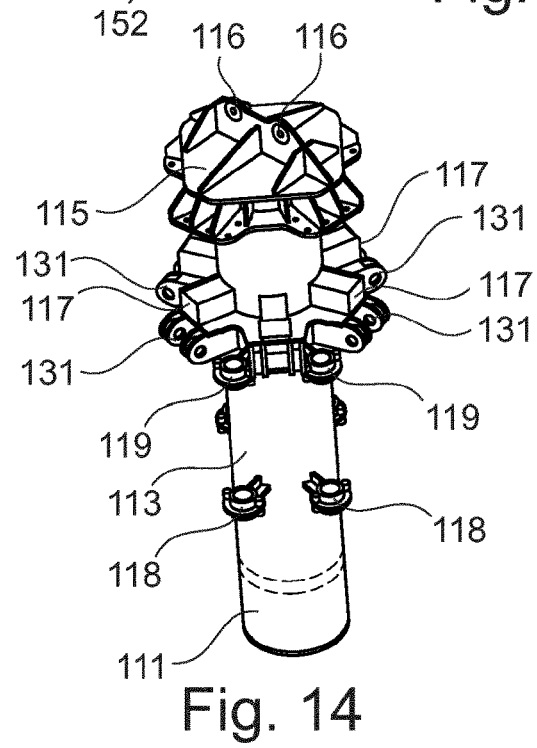
FIG. 14 is a perspective view of the central column of the tool of FIGS. 6 and 7, FIGS. 15 and 16 are perspective views of the lower sliding ring of the tool of FIGS. 6 and 7, respectively from top and below.
Figure 15:
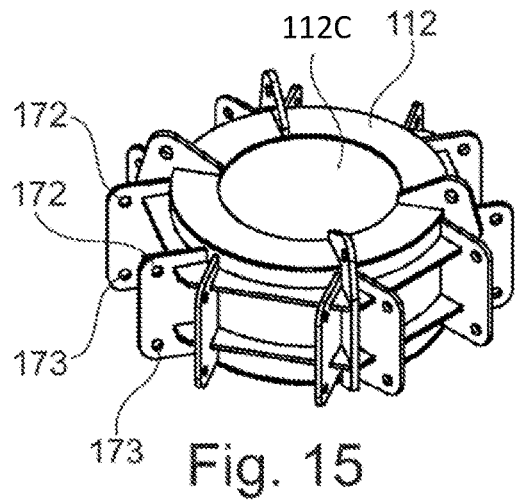
Figure 16:
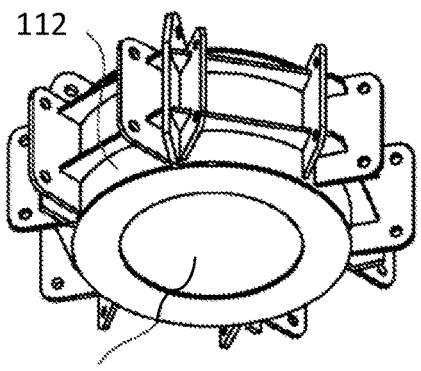
Figure 17:
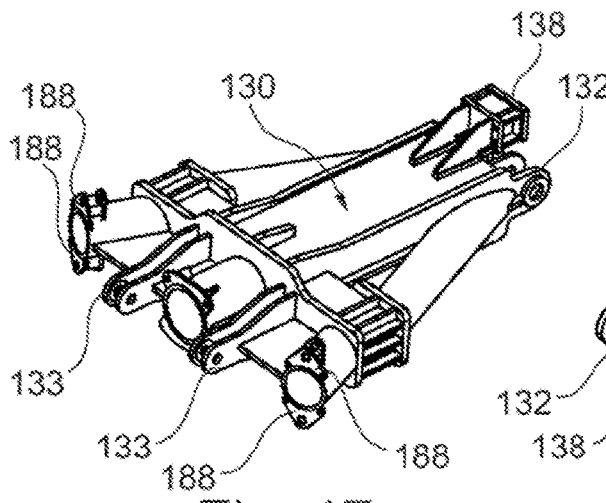
FIGS. 17 and 18 are perspective views of a reinforced arm of the tool of FIGS. 6 and 7, respectively from top and below.
Figure 18:
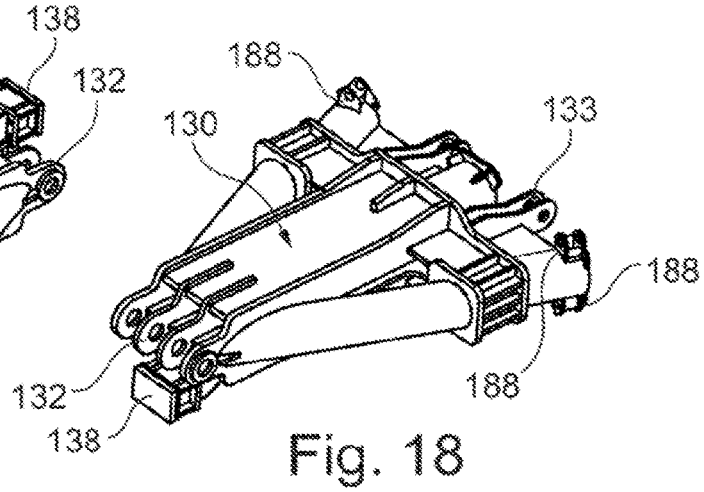
Figure 19:
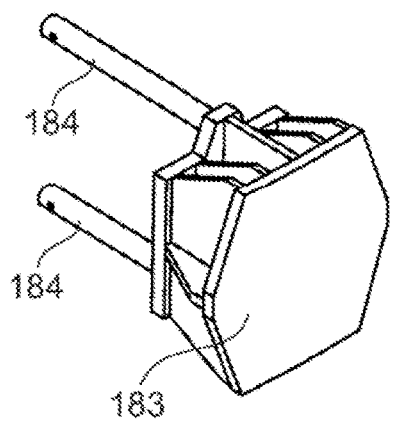
FIGS. 19 and 20 are perspective views in isolation of a pressure pad of the tool of FIGS. 6 and 7, respectively from the outside and from the inside of the tool.
Figure 20:
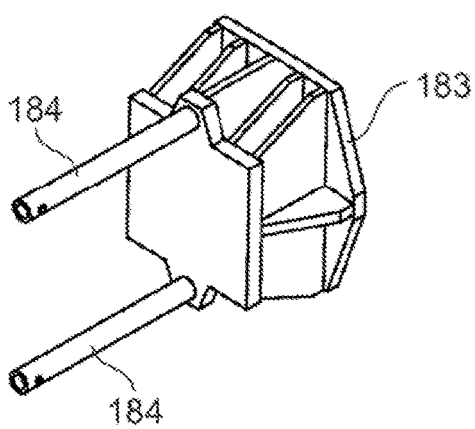

The body of the cylinders 120 may be each fixedly held along the column 111 by pairs of collars 118 and 119 as shown in FIG. 14.

The clamping mechanism 10 comprises reinforced arms 130 (shown in isolation in FIGS. 17 and 18) that are articulated at one end 132 to respective couplings 131 present on the column 111 close to the upper platform 115.

The other end of the reinforced arms 130 comprises couplings 133, for example of the double flange type, for attaching a respective crown element 140 or 150.

Figure 6:
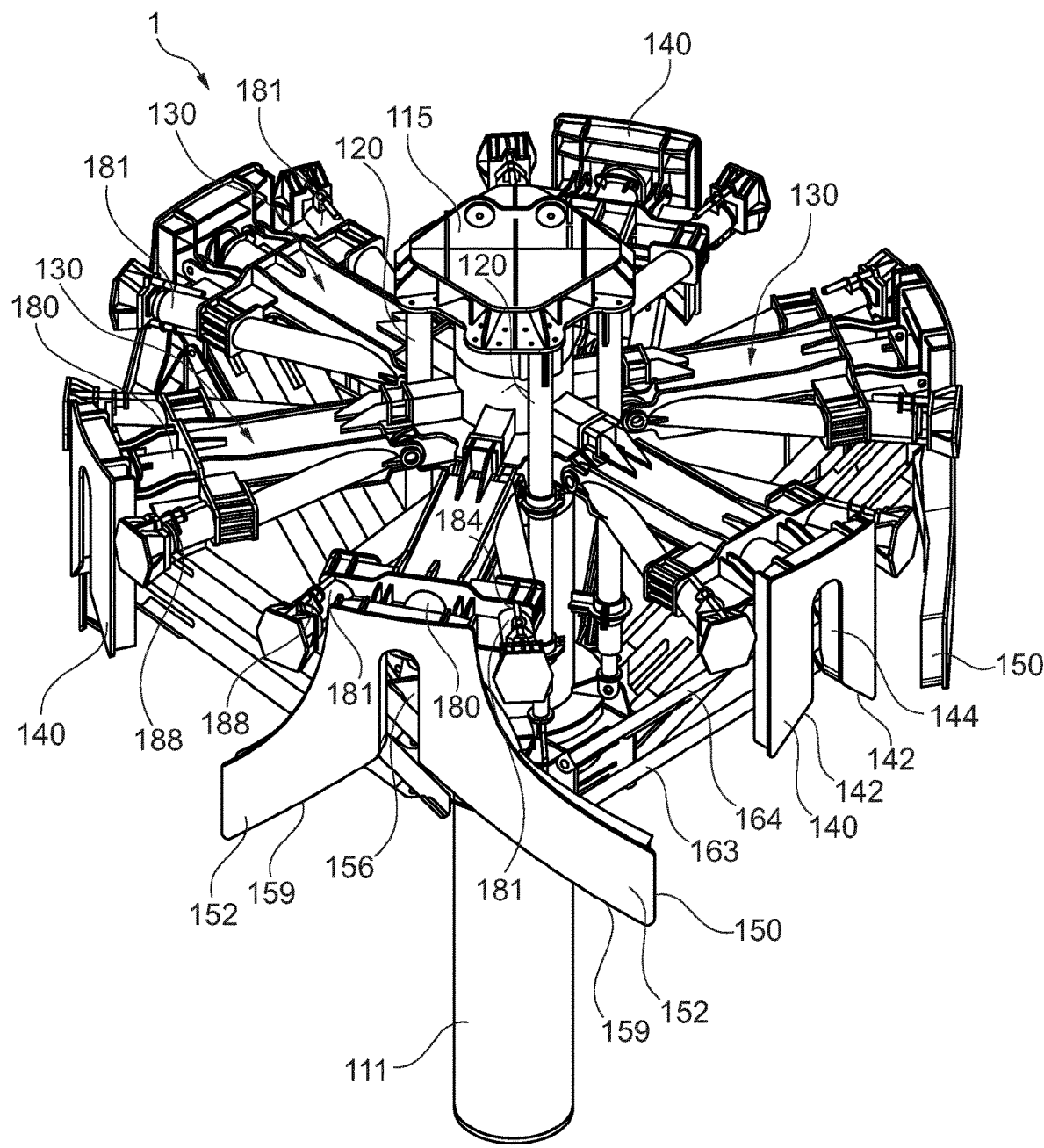
FIG. 6 is a perspective view of a second embodiment of a tool in accordance with the present invention, as seen from above.
Figure 7:
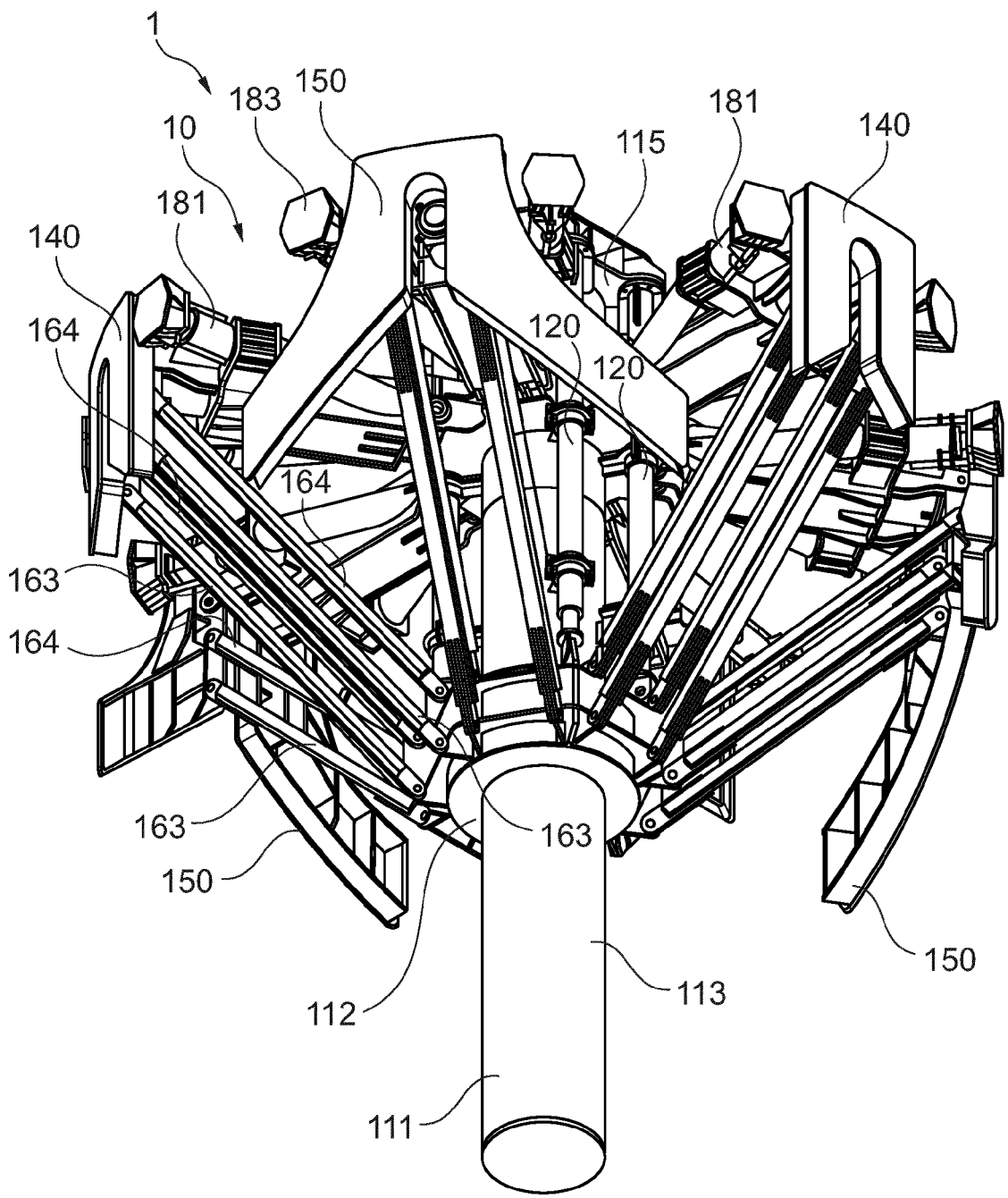
FIG. 7 is a perspective view of the tool of FIG. 6 as seen from below.
Figure 10:
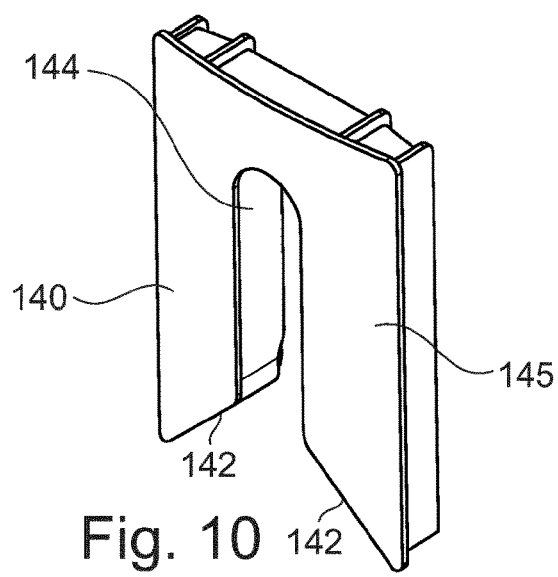
FIGS. 10 and 11 are perspective views in isolation of an intermediate crown element of the tool of FIGS. 6 and 7, from the outside and from the inside point of view respectively.

As one can see on FIGS. 6 and 7, the tool 1 may comprise three guiding crown elements 150 that alternate angularly with intermediate crown elements 140 when one turns around the longitudinal axis of the tool 1.

Figure 11:
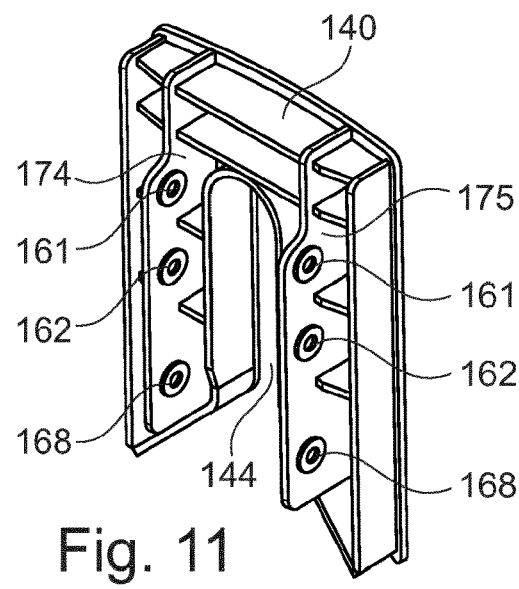
Figure 12:
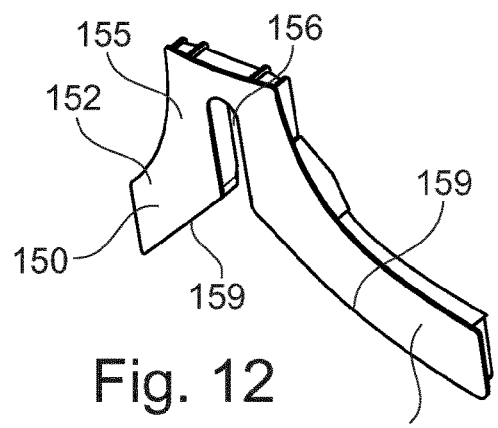
FIGS. 12 and 13 are perspective views in isolation of a guiding crown element of the tool of FIGS. 6 and 7, respectively from the outside and from the inside of the tool.
Figure 13:
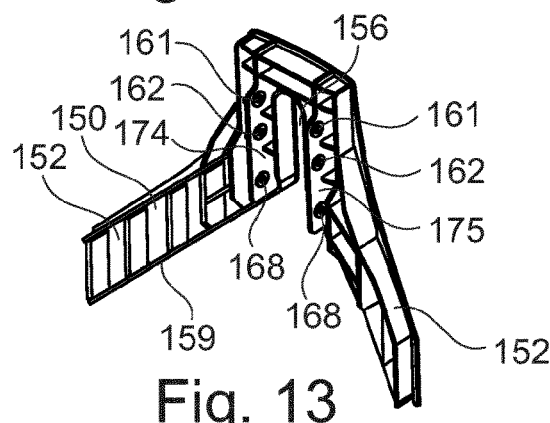

As one can see in FIGS. 11 and 13, each crown element 140 or 150 comprises on an internal face thereof upper couplings 161 for pivotably attaching the element to the couplings 133 of the corresponding arm 130.

Pairs of parallel connecting bars 163 and 164 respectively connect lower 168 and intermediate 162 couplings of the crown elements 140 and 150 to respective couplings 173 and 172 of the sliding ring 112.

Each crown element 140 or 150 comprises two internal ribs 174 and 175 each provided with the couplings 161, 162 and 168, and each crown element 140 or 150 is thus connected to the sliding ring 112 with four connecting bars in total, i.e. two bars 163 and two bars 164.

Each pair of bars 163, 164 forms with corresponding crown element and the sliding ring a parallelogram that forces the crown element to move with a same vertical orientation when the ring 112 slides along the column 111 and the arm 130 pivots relative to the column 111.

Each arm 130 carries a central cylinder 180 configured to act on the expandable structure as will be detailed below and two side cylinders 181 configured to clamp the tool against the internal surface of the sleeve 2. The side cylinders 181 act on pads 183 (shown in FIGS. 19 and 20) that are slidably mounted on the corresponding arm 130 thanks to a pair of parallel rods 184 engaged into a pair of corresponding guides 188 (shown in FIG. 17 inter alia) carried by the arm 130.

The stroke of the central cylinders 180 may be about 400 mm. Their force may be about 160 tons each.

The pads 183 may travel at least 200 mm when the side cylinders are actuated, for example about 300 mm. The stroke of the side cylinders 181 may be about 300 mm. Their force may be about 80 tons each.

The side cylinders 181 move in a direction that makes a non-zero angle with the longitudinal axis of the corresponding arm 130 so as to be oriented substantially perpendicularly to the internal surface of the sleeve 2, as shown in FIGS. 9A and 9B.

Each arm 130 comprises at its radially inner end a stop 138 (shown in FIGS. 17 and 18 inter alia) that is positioned to bear against a corresponding stop 117 fixed on the column 111 between the platform 115 and the couplings 131, so that the arm 130 is substantially horizontal when the sliding ring 112 reaches its upper travel end on the column 111.

The guiding crown elements 150 have an angular extension around the longitudinal axis of the tool that is greater than the one of the intermediate crown elements 140.

The guiding crown elements 150 each comprises a pair of rails 152 that diverge towards the bottom. The bottom edges 159 of the rails 152 converge towards a central notch 156 that extends over a major part of the guiding crown element 150.

The intermediate crown elements 140 have bottom edges 142 that converge towards a central notch 144.

The crown elements 140 and 150 comprise respective outer shields 145 and 155 reinforced on their internal face by various reinforcing ribs, as shown in FIGS. 11 and 13.

Figure 21A:
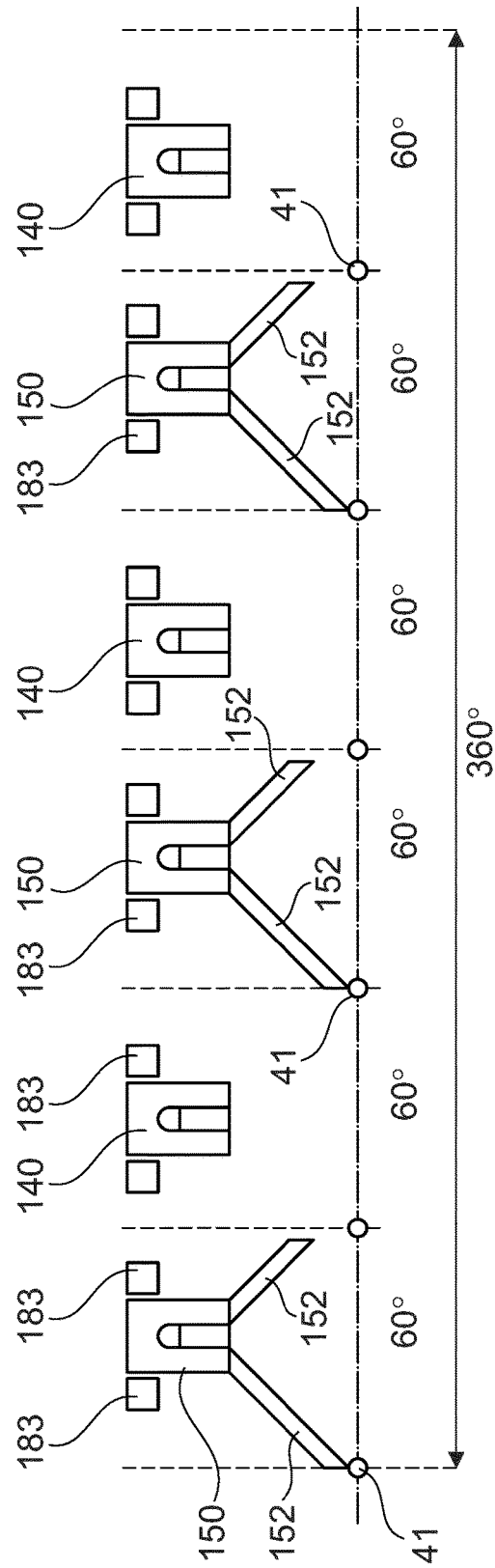
FIGS. 21A and 21B are developed views illustrating the positioning of the crown elements of the tool relative to the pins of the expandable structure.
Figure 21B:
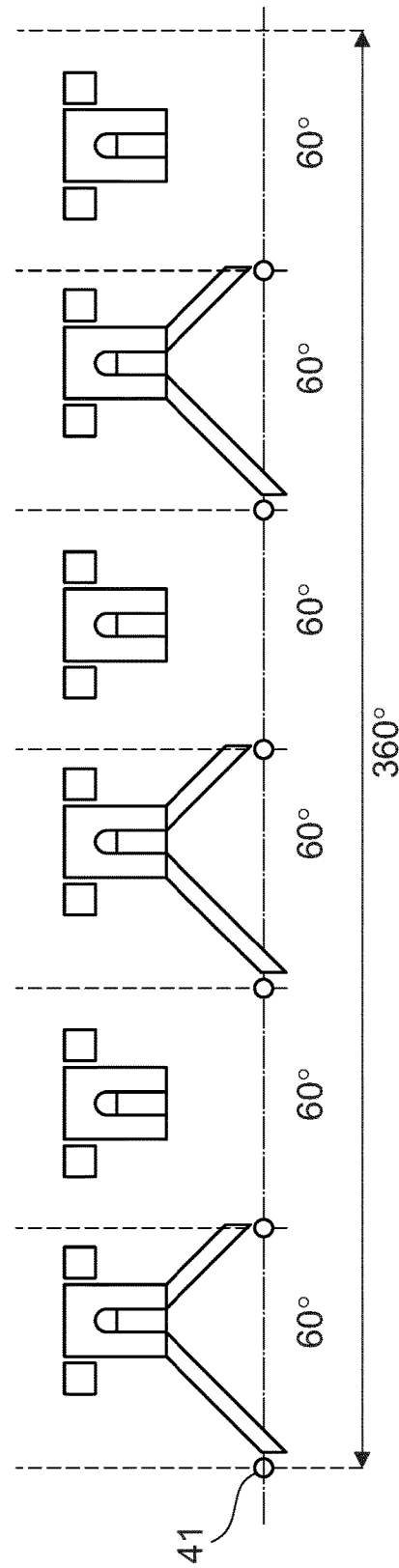

The rails 152 are configured for capturing the fingers 41 of the expandable structure as the tool 1 is moved downwards into the sleeve 2, as illustrated in FIGS. 21A and 21B, for two different relative angular position of the tool 1 with respect to the expandable structure.

On these Figures, one can see that the angular spacing of the distal ends of the rails 152 is slightly less than 60°, i.e. the angular pitch between two successive fingers 41, so that one finger 41 will contact either one of the rails 152 during downward movement of the tool 1 into the sleeve 2.

One can see also on FIGS. 21A and 21B that one of the rails 152 is shorter than the other, for example the left one, so that both rails 152 can never contact simultaneously each a finger 41.

The tool 1 of FIGS. 6 and 7 can be used in a similar way as the tool 1 described with reference to FIGS. 1, 2 and 4.

Figure 24:
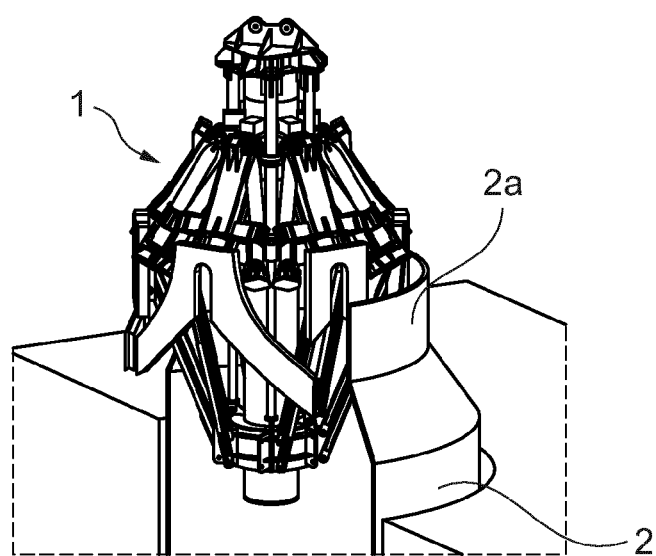
FIG. 24 shows introduction of the tool in the sleeve.

The tool 1 is hoisted in the sleeve 2 equipped with the expandable structure;

during this insertion, the tool 1 is in its retracted configuration shown in FIGS. 8A, 9A and 24.

The sleeve 2 may exhibit a neck portion 2a of reduced diameter at its upper end as shown in FIG. 24. The external diameter of the tool 1 is nevertheless small enough to go through this neck portion 2a.

For example, the diameters R1 to R3 shown in FIG. 9A correspond to the following values, these values being given for purposes of illustration only:

R1 (outside diameter of tool in retracted position) between 5500 mm and 6000 mm, for example about 5600 mm, R2 (inside diameter of sleeve 2) between 7000 and 8000 mm, for example about 7600 mm, R3 (inside diameter of foundation hole) between 8200 and 9000 mm, for example about 8400 mm.

The neck portion 2a of the sleeve 2 may have an internal diameter R4 which is only slightly greater than the outside diameter R1 of the tool 1 in its retracted configuration. For example, R4-R1 ranges from 100 to 200 mm, for example is about 150 mm.

While still over the expandable structure, the clamping mechanism 10 is actuated to change the tool 1 to its expanded configuration, as illustrated in FIGS. 8B and 9B.

The cylinders 120 are actuated to move the sliding ring 112 upwards along the column 111. This causes the arms 130 to pivot upwards, as they are pushed by the connecting bars 163 and 164.

In the expanded condition of the tool 1, its outside diameter R1' has increased for example by at least 25%, better at least 30%, and R1' is such that the difference R2−R1' ranges between 50 and 150 mm, for example is about 100 mm.

When the tool 1 is further hoisted down, the fingers 41 engage with the rails 152. The slope of these rails is high enough to cause the tool 1 to pivot relative to the fingers 41 and enter the notches 144 and 156.

The engagement of the fingers 41 with these notches causes the central cylinders 180 to be aligned each with a respective finger 41.

Figure 22:
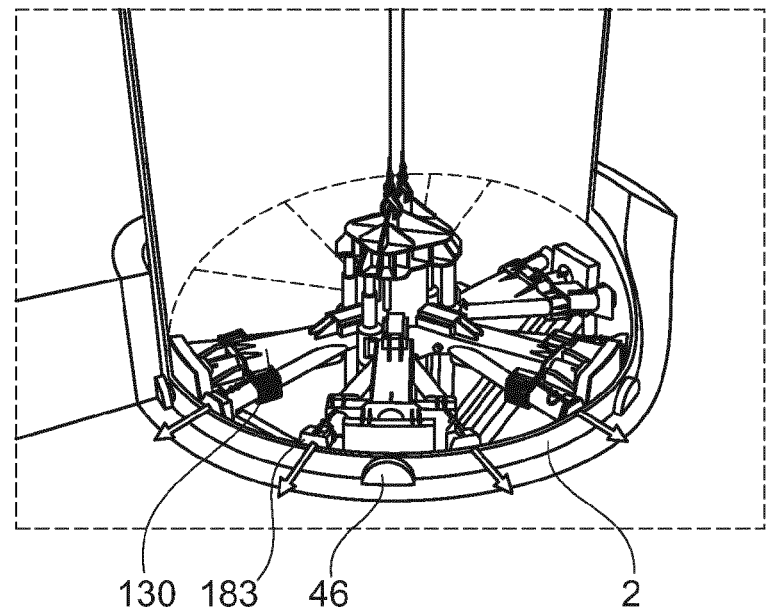
FIGS. 22 and 23 are perspective views illustrating partially the clamping of the tubular sleeve inside the foundation hole.

The side cylinders 181 may then be operated to move the pads 183 radially outwards, as illustrated in FIG. 22, to clamp the tool 1 inside the sleeve 2.

Figure 23:
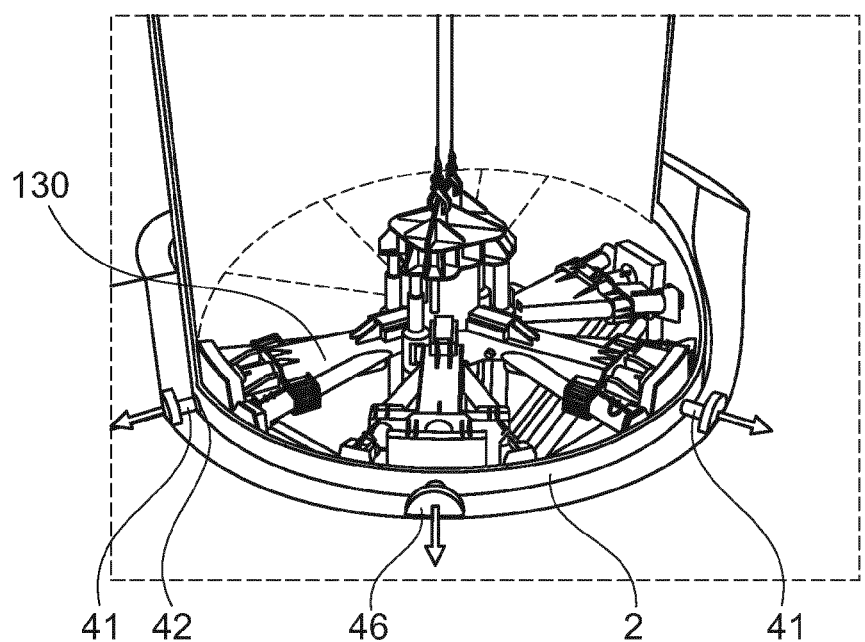

Once the tool 1 is secured within the sleeve 2, the central cylinders 180 are actuated to push the fingers in the radial direction outwards, until they bear against the internal surface of the foundation hole, as illustrated in FIG. 23.

For a given finger 41 pushed by a central cylinder 180, a reaction load is applied to the two diametrically opposed pads 183 by the sleeve.

Concrete or cementitious grout or other binder can then be poured in the gap between the sleeve 2 and the foundation hole while the sleeve 2 is maintained by the tool 1.

When the concrete or cementitious grout or other binder has set, the central cylinders 180 are retracted. Then the side cylinders 181 are retracted. The tool 1 can be hoisted from the surface and the cylinders 120 are actuated to move the sliding ring 112 downwards.

The weight of the connecting bars 163 and 164 together with the weight of the arms 130 and the crown elements 140 and 150 help the arms 130 to pivot downwardly back to the retracted position.

Once fully retracted, the tool 1 can be hoisted out of the pile.

The invention is not limited to anchorage of a sleeve in a receiving structure being a foundation hole.

Figure 25:
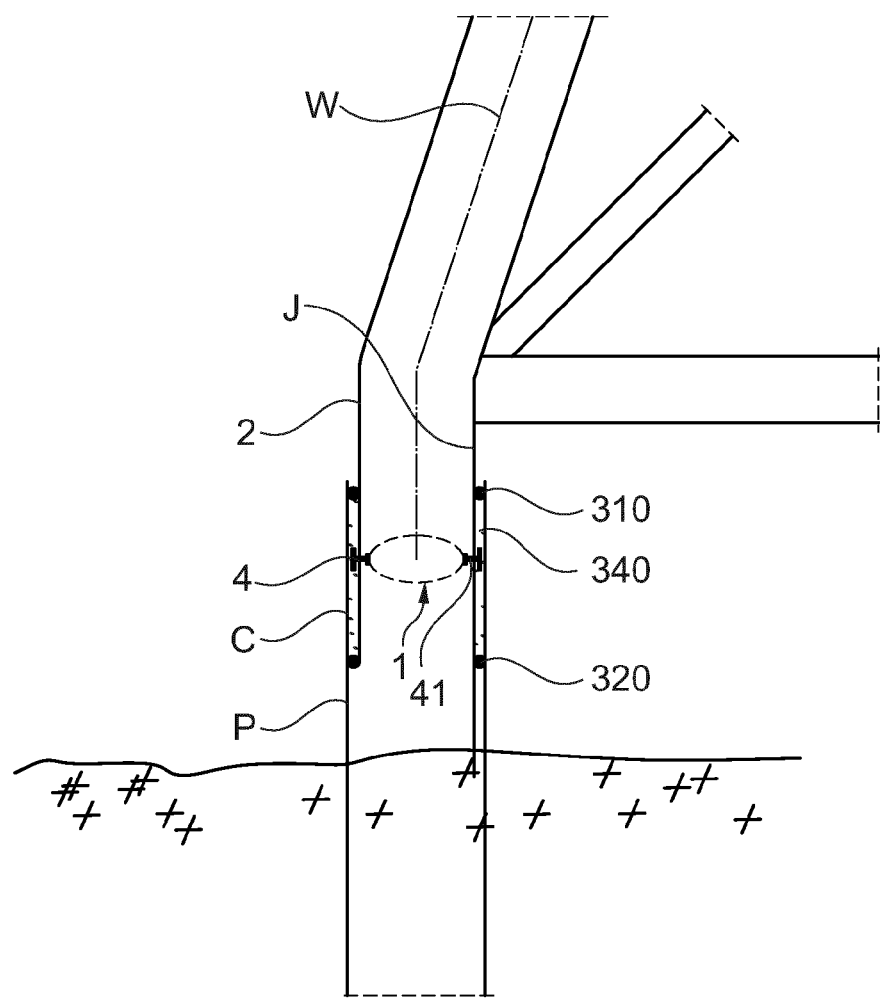
FIG. 25 illustrates anchorage of a jacket leg in a driven pile thanks to a system in accordance with the present invention.

The receiving structure may also be another structure such as a pile already anchored in the seabed, such as driven pile P, as shown in FIG. 25.

This pile 25 may have been anchored in any known manner or in accordance with the present invention.

In the example shown in FIG. 25, the sleeve 2 is part of a jacket leg J and is provided with an expandable structure 4 such as the one already described above, with reference to the other illustrated embodiments of the invention.

The tool 1 may be inserted in the retracted state along path W, which may be non-rectilinear and include at least one turn, as shown.

Inflatable seals 310, 320 may be positioned between the sleeve 2 and the anchor pile P, and delimit axially an annular space 340 in which the fingers 41 of the expandable structure 4 may expend when the tool 1 is actuated.

To anchor the jacket leg J, the tool 1 is operated in a similar way as described above, being inserted in a retracted configuration until it cooperates with the expendable structure 4.

Then, the tool 1 is actuated to clamp the tool inside the sleeve 2 and immobilize the sleeve 2 in the anchor pile P. Seals 310 and 320 are actuated and cement or other binder is poured in the annular space 340. The tool 1 is left in place until the cement or other binder has set, and then is removed.

The invention claimed is:

1. A system for holding a tubular sleeve in a receiving structure during setting of cement or another binder introduced in a fluid state between the sleeve and the receiving structure, the system comprising:

an expandable structure mounted on the sleeve and configured to deform between an inactive configuration allowing insertion of the sleeve in the receiving structure and an active configuration immobilizing the sleeve in the receiving structure; and a tool configured to be inserted in the sleeve and cause the expandable structure to deform from the inactive configuration to the active configuration.

2. The system as claimed in claim 1, wherein the expandable structure comprises movable elements mounted on the sleeve.

3. The system as claimed in claim 1, wherein the expandable structure is positioned on the sleeve so that, when the sleeve is in place in the receiving structure, the expandable structure is closer to an opening of the receiving structure than to a bottom of the receiving structure.

4. The system as claimed in claim 1, further comprising an additional expandable structure positioned below sleeve mid height and configured to hold a bottom section of the sleeve.

5. The system as claimed in claim 2, wherein:

the tool comprises first reliefs; and the expandable structure comprises corresponding second reliefs configured to interfere with the first reliefs during introduction of the tool into the sleeve, so that the tool is disposed at a predefined angular position with respect to the expandable structure.

6. The system as claimed in claim 5, wherein the first reliefs comprise crown elements, each crown element having an opening having edges that converge towards a notch for engaging a respective guide member of the expandable structure.

7. The system as claimed in claim 6, wherein:

the crown elements comprise guiding crown elements alternating with intermediate crown elements of reduced angular extension; and each guiding crown element comprises two rails that diverge from one another in a downward direction, an angular extension of the rails being less than an angular pitch between the movable elements, so that only one rail contacts the expandable structure when the tool is inserted into the sleeve, one of the rails having a larger angular extension than the other rail.

8. The system as claimed in claim 6, wherein the tool comprises a column comprising articulated arms, the arms each bearing a central cylinder for acting on the expandable structure and at least one other cylinder for clamping the tool inside the sleeve.

9. The system as claimed in claim 8, wherein:

each crown element is articulated at one end of a respective arm; and the tool comprises:

a sliding ring;

at least one cylinder configured for moving the ring along the column; and parallel bars connecting each crown element to the sliding ring, so that a displacement of the sliding ring along the column causes the arms to pivot with the crown elements while keeping an orientation substantially parallel to a longitudinal axis of the tool.

10. The system as claimed in claim 1, wherein the tool comprises a clamping mechanism configured for clamping the tool inside the sleeve when actuated.

11. The system as claimed in claim 10, wherein the clamping mechanism comprises a deformable articulated structure configured for transforming a contraction force along a longitudinal axis of the articulated structure into a radially outward expansion thereof.

12. The system as claimed in claim 1, wherein the receiving structure is a foundation hole.

13. The system as claimed in claim 12, wherein the sleeve is a sleeve of an anchor pile.

14. The system as claimed in claim 1, wherein the receiving structure is an anchor pile.

15. The system as claimed in claim 14, wherein the sleeve is a sleeve of a jacket leg.

16. The system as claimed in claim 15, further comprising an upper seal and a lower seal interposed between the sleeve and the receiving structure and delimiting a space for accommodating the cement or other binder.

17. A method for anchoring a tubular sleeve in a receiving structure using the system of claim 1, the method comprising:
   a) introducing the tubular sleeve in the receiving structure, with the expandable structure mounted on the sleeve in an inactive configuration;
   b) expanding the expandable structure with the tool to immobilize the sleeve in the receiving structure;
   c) introducing cement or another binder into the receiving structure and allowing the cement or other binder to set; and
   d) removing the tool.

18. The method as claimed in claim 17, wherein:
the tool is introduced into the tubular sleeve in a retracted state; and
the method further comprises expanding the tool to clamp the tool in the tubular sleeve, after step a) and before step b).

19. The method as claimed in claim 18, wherein the tool is introduced through a reduced diameter neck portion of the sleeve.

20. The method as claimed in claim 17, wherein:
in the expanded state, the expandable structure contacts an inner surface of the receiving structure; and
the concrete or other binder is introduced to a space between the tubular sleeve and the receiving structure.

21. The method as claimed in claim 17, wherein the receiving structure is a foundation hole.

22. The method as claimed in claim 21, wherein:
in the expanded state, the expandable structure contacts a casing extending in the foundation hole between the tubular sleeve and the foundation hole; and
the concrete or other binder is introduced between the tubular sleeve and the casing.

23. The method as claimed in claim 21, wherein the sleeve is a sleeve of an anchor pile.

24. The method as claimed in claim 17, wherein the receiving structure is an anchor pile.

25. The method as claimed in claim 24, wherein the sleeve is a sleeve of a jacket leg.

26. The method as claimed in claim 25, further comprising inflating inflatable seals disposed between the sleeve and the anchor pile to axially delimit a space for accommodating the cement or other binder.

\* \* \* \* \*